(12) United States Patent
Karapantelakis et al.

(10) Patent No.: US 11,392,883 B2
(45) Date of Patent: Jul. 19, 2022

(54) METHOD AND SYSTEM FOR CELLULAR-BASED SHIPMENT TRACKING

(71) Applicant: Telefonaktiebolaget LM Ericsson (publ), Stockholm (SE)

(72) Inventors: Athanasios Karapantelakis, Solna (SE); Qiang Li, Täby (SE); Leonid Mokrushin, Uppsala (SE); Rana Pratap Sircar, Haryana (IN); Maxim Teslenko, Sollentuna (SE); Aneta Vulgarakis Feljan, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/756,656

(22) PCT Filed: Oct. 18, 2017

(86) PCT No.: PCT/EP2017/076571
§ 371 (c)(1),
(2) Date: Apr. 16, 2020

(87) PCT Pub. No.: WO2019/076448
PCT Pub. Date: Apr. 25, 2019

(65) Prior Publication Data
US 2020/0334629 A1 Oct. 22, 2020

(51) Int. Cl.
*G06Q 10/08* (2012.01)
*H04W 4/029* (2018.01)
(Continued)

(52) U.S. Cl.
CPC ........ *G06Q 10/0833* (2013.01); *H04W 4/029* (2018.02); *H04W 4/35* (2018.02); *H04W 8/26* (2013.01); *H04W 60/00* (2013.01)

(58) Field of Classification Search
CPC .... G06Q 10/0833; H04W 4/029; H04W 4/35; H04W 60/00; H04W 8/26
See application file for complete search history.

(56) References Cited

U.S. PATENT DOCUMENTS

| 7,974,637 | B1 | 7/2011 | Taveniku | |
|---|---|---|---|---|
| 9,633,327 | B2* | 4/2017 | Hamm | G06Q 10/0833 |

(Continued)

FOREIGN PATENT DOCUMENTS

| EP | 2 114 063 A1 | 11/2009 |
|---|---|---|
| WO | 2014 006643 A1 | 1/2014 |

OTHER PUBLICATIONS

RCR Wireless New, "LTE Attach Procedure Call Flow Address the Basics of Attach Procedures", May 9, 2014, RCR Wireless New, p. 2 (Year: 2014).*

(Continued)

*Primary Examiner* — Diane D Mizrahi
(74) *Attorney, Agent, or Firm* — Baker Botts L.L.P.

(57) ABSTRACT

Methods (200, 900, 1100) and devices (300, 120, 130, 400, 510, 1000, 1200, 1340) enable tracking using existing mobile networks' infrastructure. A radio module (110, R, 1310) that is attached to a shipment sends one or more network attachment requests including a network-type identifier. Although the requests are rejected, the network records location information if the network-type identifier is actively associated with a shipment identifier.

15 Claims, 13 Drawing Sheets

(51) Int. Cl.
  *H04W 4/35*  (2018.01)
  *H04W 8/26*  (2009.01)
  *H04W 60/00* (2009.01)

(56) References Cited

U.S. PATENT DOCUMENTS

| | | | | |
|---|---|---|---|---|
| 2010/0015949 | A1* | 1/2010 | Bradley | H04W 88/06 |
| | | | | 455/410 |
| 2010/0229220 | A1* | 9/2010 | Tsai | G06Q 10/10 |
| | | | | 726/4 |
| 2011/0217989 | A1* | 9/2011 | Fodor | H04W 4/024 |
| | | | | 455/456.1 |
| 2015/0327073 | A1* | 11/2015 | Rommer | H04W 60/02 |
| | | | | 455/410 |
| 2018/0160387 | A1* | 6/2018 | Chastain | H04W 60/04 |
| 2018/0174097 | A1* | 6/2018 | Liu | H04L 9/3239 |

OTHER PUBLICATIONS

Global Trade Item No. retrieved from "https://en.wikipedia.org/w/index.php?title=Global_Trade_Item_Number&oldid=94718268"—Mar. 24, 2020.
GSM CELL ID retrieved from https://en.wikipedia.org/w/index.php?title=GSM_Cell_ID&oldid=940284909—Feb. 11, 2020.
PCT International Search Report issued for International application No. PCT/EP2017/076571—dated Nov. 22, 2017.
Communication Pursuant To Article 94(3) EPC issued for Application No. 17 784 962.7-1222—dated Jun. 7, 2021.

* cited by examiner

METHOD AND SYSTEM FOR CELLULAR-BASED SHIPMENT TRACKING

PRIORITY

This nonprovisional application is a U.S. National Stage Filing under 35 U.S.C. § 371 of International Patent Application Serial No. PCT/EP2017/076571 filed Oct. 18, 2017 and entitled "METHOD AND SYSTEM FOR CELLULAR-BASED SHIPMENT TRACKING" which is hereby incorporated by reference in its entirety.

TECHNICAL FIELD

Embodiments of the subject matter disclosed herein generally relate to methods and network devices for tracking shipments using cellular networks.

BACKGROUND

Localizing shipments has developed in response to customers' desire to track their goods and to predict their delivery. When a shipment includes quickly perishable goods (such as agricultural products and pharmaceuticals) transit time and route may be critical for product quality. Well-known methods of tracking rely on labels attached to the shipment and scanned automatically or manually during loading, sorting, warehousing and delivery. The labels may be numeric, alpha-numeric, 1D or 2D barcodes. Using an interface to a tracking information repository, customers are often able to find out when a shipment of known identity was scanned at departure, arrival or other predetermined locations along a route. However, it is not possible to know where the shipment is in between these locations, particularly if detours from a predetermined route occur.

The conventional end-to-end tracking of goods, from their source to their destination, requires special infrastructure and/or human involvement. For example, in courier services, a package is assigned an identity number, identified by a Quick Response (QR) code, and is scanned at every transit point physically, either by humans or machines. The scans trigger sending information about the package (e.g., location and time of scan) to a central repository. The information stored in the central repository is accessible using the appropriate application program interface (API).

In addition to logistical limitations (i.e., not knowing where the shipment is when a long time passes from a previous scan, or a detour has occurred), conventional tracking methods are costly both in terms of equipment and labor.

In view of the above-identified problems of conventional tracking, it has become apparent that improvements are desirable to overcome drawbacks and lower costs.

SUMMARY

In order to avoid problems of conventional tracking methods and lower costs, various embodiments implement shipment tracking using cellular network infrastructure. Radio modules, which may be simple, cheap and reusable, are attached to shipments and programmed to attempt at times to attach to the local cellular network using network-type identifiers, such as dummy International Mobile Subscriber Identity (IMSI). If a network-type identifier in a network attachment request has been associated with a shipment identifier, the network operator logs location and time information about the shipment, thereby allowing tracking of the shipment.

According to an embodiment, there is a method performed by a network node for tracking shipments that include radio modules. The method includes receiving a network attachment request with a network-type identifier, from a radio module that is included in a shipment, determining whether the network-type identifier is associated with a shipment identifier, and generating a record indicating a location of the shipment when the radio module has transmitted the network attachment request, if determined that the network-type identifier is associated with the shipment identifier. According to another embodiment there is a network node device including a network interface and a processing unit configured to perform this method. In yet another embodiment, there is a computer program which makes a network device in a communication network to perform this method. Another embodiment is a non-transitory computer readable recording media storing executable codes which, when executed by a network device in a communication network make the network device perform the method.

According to yet another embodiment there is an apparatus for tracking shipments that include radio modules. The apparatus includes a first module for receiving a network attachment request with a network-type identifier, from a radio module that is included in the shipment, a second module for determining whether the network-type identifier is associated with a shipment identifier of the shipment, and a third module for generating a record including a location of the shipment when the radio module has transmitted the network attachment request, if determined that the network-type identifier is associated with the shipment identifier.

According to another embodiment there is a method for tracking shipments that include radio modules performed by a network device. The method includes generating a message about a network-type identifier being associated with a shipment identifier of the shipment, and transmitting the message to a tracking information repository. A radio module included in the shipment is configured to submit one or more requests to attach to a radio network using the network-type identifier. According to another embodiment there is a transit authority device including a network interface and a processing unit configured to perform this method. In yet another embodiment, there is a computer program which makes a device in a communication network to perform this method. Another embodiment is a non-transitory computer readable recording media storing executable codes which, when executed by a device in a communication network make the network device perform this method.

According to yet another embodiment there is an apparatus for tracking shipments that include radio modules. The apparatus includes a first module for generating a message about a network-type identifier being associated with a shipment identifier of the shipment, and a second module for transmitting the message to a radio network device. Here, a radio module included in the shipment is configured to submit one or more requests to attach to a radio network using the network-type identifier According to another embodiment there is a method performed by a network operator device for tracking shipments that include radio modules. The method includes receiving a tracking information request, TIR, related to the shipment, and location information in response to the TIR. The TIR includes at least one of a shipment identifier of the shipment and a network-type identifier associated with the shipment identifier, the network-type identifier being used by the radio module for sending one or more network attachment requests. According to another embodiment there is a network operator device including a network interface and a processing unit configured to perform this method. In yet another embodiment, there is a computer program which makes a network operator device in a communication network to perform this method. Another embodiment is a non-transitory computer readable recording media storing executable codes which, when executed by a network operator device in a communication network make the network operator device perform this method.

According to yet another embodiment there is network operator device for tracking shipments that include radio modules. The network operator device includes a first module for receiving a tracking information request, TIR, related to a shipment, and a second module for retrieving location information in response to the TIR. The TIR including at least one of a shipment identifier and a network-type identifier associated with the shipment identifier, and the network-type identifier is used by the radio module for sending one or more network attachment requests.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments are described in the context of a wireless cellular network, but plural network operators may cooperate. The described functionality may be executed in a cloud environment.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, particular features, structures or functions may be combined in any suitable manner in one or more embodiments.

Figure 1:
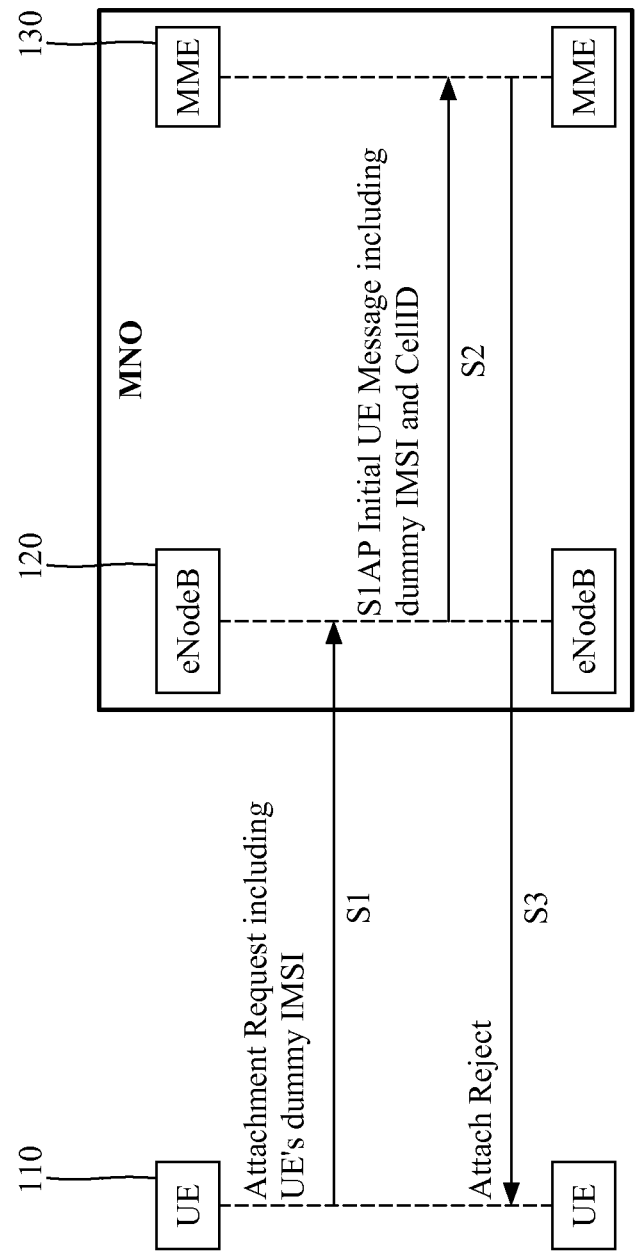
FIG. 1 illustrates the tracking mechanism in one embodiment.

FIG. 1 illustrates the tracking mechanism implemented in the embodiments described later in this section. Before being sent from a source or origin location, every shipment (which may be as small as a single pocket-size packet or as big as a shipping container) has a radio module 110 attached so as not to separate from one another before arriving at the destination. When the radio module is attached to the shipment, information on the dummy IMSI being associated with a shipment identifier is supplied to the network operator. The network operator may store this type of information in a dedicated database on one of the network's core devices. The information may be shared with other network operators, enabling the tracking to operate across networks.

Radio module 110, which is labeled User Equipment (UE) in FIG. 1, may be as simple as a cellular module with an antenna, a power supply and a processing unit, and may be packed inside or fastened to the shipment. The radio module is turned ON and programmed to attempt attaching to cellular networks using a mock International Mobile Subscriber Identity, IMSI (hereinafter called "dummy IMSI"). IMSI is a 15-digit identity of a mobile subscription and is unique globally. IMSIs are used for global network service subscriptions. The dummy IMSI may be stored in either a mock SIM (Subscriber Identity Module) card, a mock eUICC (embedded Universal Integrated Circuit Card) module or iUICC software. In this context, the term "mock" indicates that the respective functionality is emulated, but not really performed. Existing protocols provide for network attachment requests that include IMSIs. For example, since the dummy IMSI stored in a mock SIM card is not registered, although network attachment is requested, attachment is not expected.

The tracking mechanism works if either the attachment request is rejected or accepted. However, the use of dummy IMSIs which are not registered and do not result in attachment is favorable because resources are saved both for the network operator (i.e., does not allocate bandwidth to the radio module) and for the radio module (which can operate in a low power state between attachment request submissions). Moreover, one of the advantages of the embodiments described in this section is that they use existing framework, such as protocols for wireless devices' attachment to networks, with minimal burden and changes.

At S1, radio module 110 sends an attachment request to a base station 120 (nodeB in 3G and eNodeB in 4G/LTE networks) that provides cellular network service in the area where the radio module 110 (and therefore also the shipment) is located at that moment. The use of standard terminology (e.g., UE or eNodeB) is this description is exemplary and not intended to be limiting. Base station 110 initiates determining whether the dummy IMSI included in the attachment request is associated with a shipment identifier at S2. Exemplarily, the base station sends a message to a Mobility Management Entity, MME, 130. The message, which includes the dummy IMSI, may be the type of already-existing message that would initiate connection if the dummy IMSI were registered to qualify the radio module to use network services. Base station 120 and MME 130 pertain to the same mobile network operator, MNO. In fact, MME indicates a functional module that may be executed on a same physical device as the base station function, on a device collocated with the base station, or on a device at a different location than the base station. The MME functionality is, in fact, not required for performing the tracking-related operations, but modifying the MME module to include these operations is minimally disruptive and efficient. For example, as already mentioned, an already-existing type of message may be used.

The MME 130 determines whether the dummy IMSI is associated with a shipment identifier. For example, a database storing dummy IMSIs and associated shipment identifiers is accessed. If the dummy IMSI is not registered, the attachment request is rejected as illustrated by S3. Presence of S3 is optional from the point of view of performing the tracking-related operations (e.g., absent S3, the radio module may wait a predetermined time to switch to a lower power mode). The radio module waits a predetermined period or until a predetermined moment to send another attachment request.

Upon receiving the indication that its attachment request was rejected, the radio module may transit to a low power mode to conserve its power supply's energy. Regular time intervals between successive radio attachment attempts may be programmed in the radio module. Depending on expected average speed of the shipment, the interval may vary, for example, between an hour and a day. As an alternative or additional, the radio module may be programmed to send network attachment requests at predetermined moments in a list.

Figure 2:
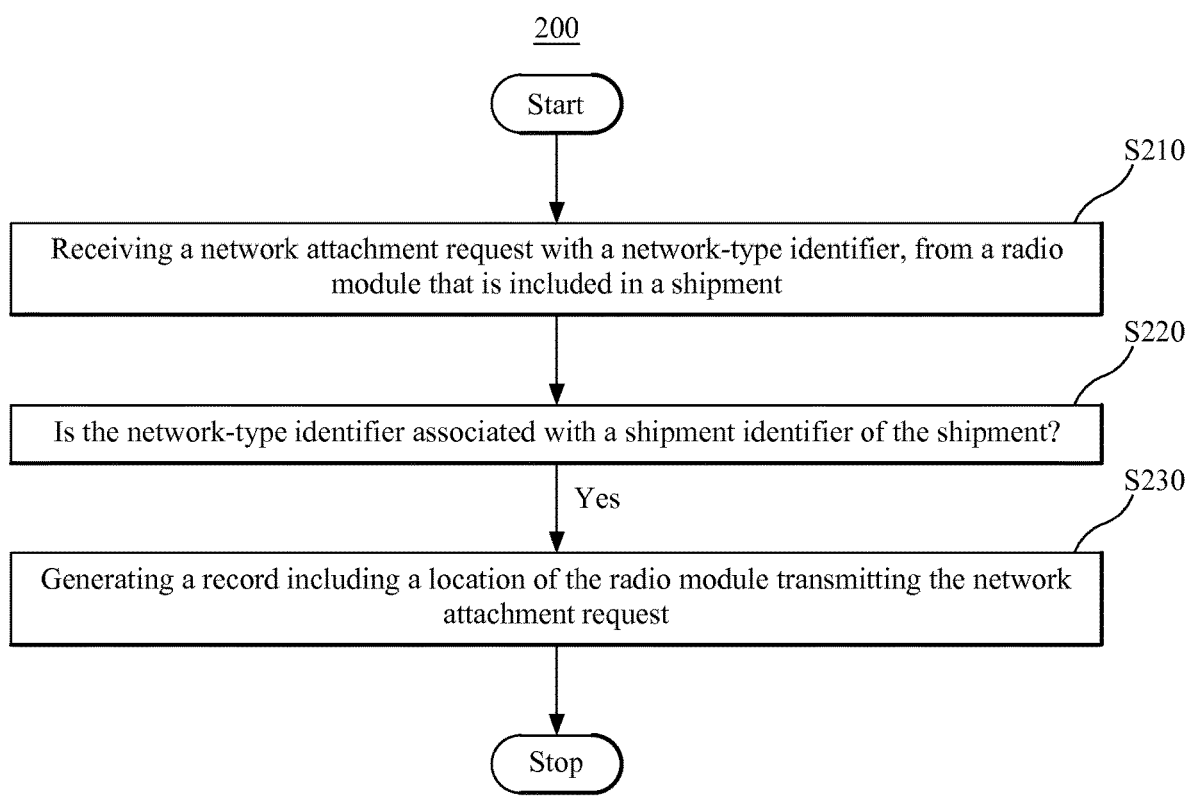
FIG. 2 is a flowchart of a tracking method according to an embodiment.

FIG. 2 is a flowchart of a tracking method 200 performed by a mobile network operator (e.g., base station 120 and/or MME 130) for tracking a shipment. Method 200 includes receiving a network attachment request with a network-type identifier from a radio module (e.g., 110) that is included in a shipment, at S210. At S220, it is determined whether the network-type identifier is associated with a shipment identifier. In describing the tracking mechanism based on FIG. 1, steps S210 and S220 appear to be performed by different physical devices but, as already discussed this is not required. Method 200 then includes, at S230, generating a record including a location of the shipment at the moment at which the radio module has transmitted the network attachment request, if determined that the network-type identifier is associated with the shipment identifier.

Figure 3:
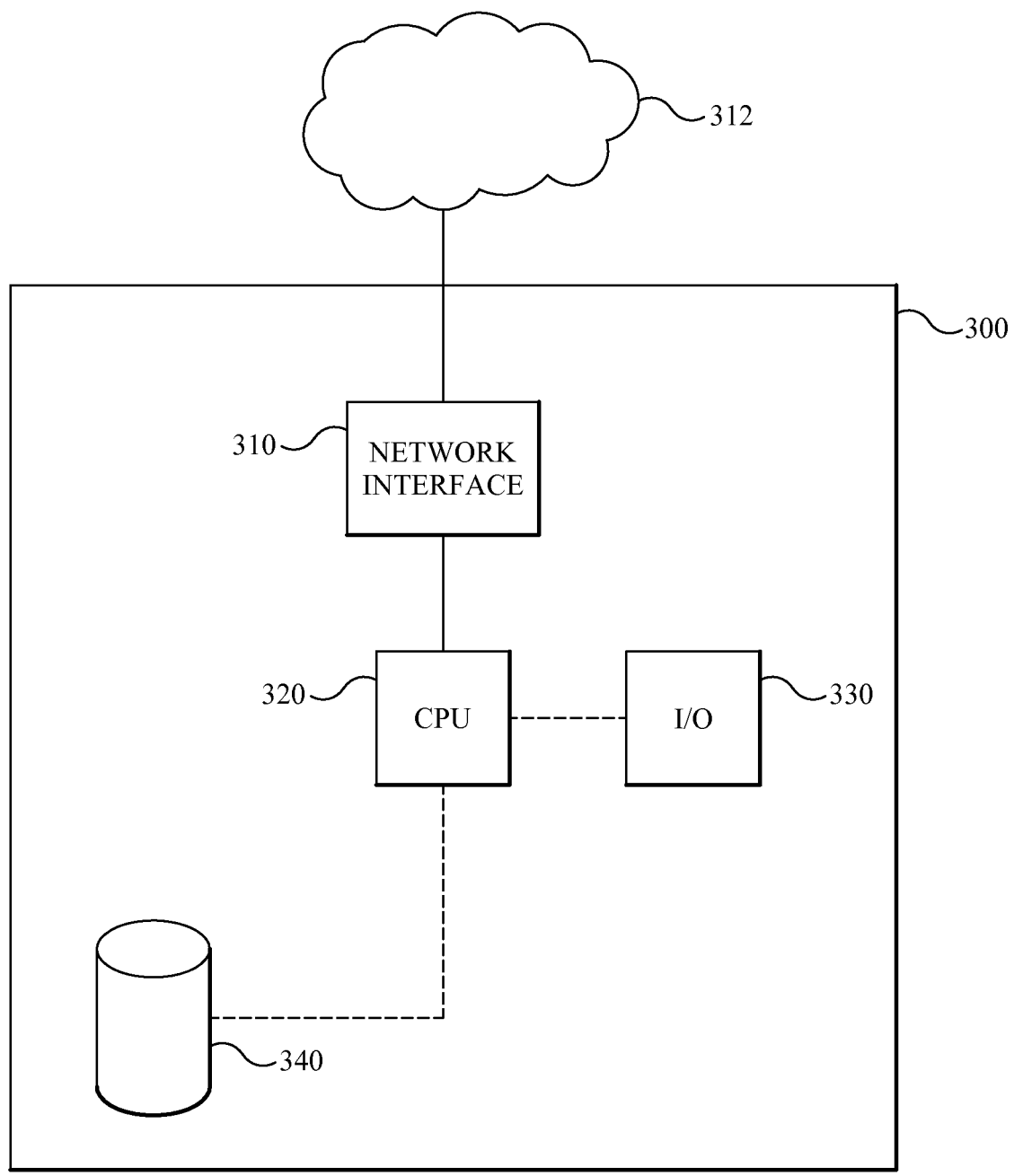
FIG. 3 is a schematic diagram of a device able to perform a tracking method according to an embodiment.

FIG. 3 is a schematic diagram of a device 300 able to perform tracking methods such as method 200. Device 300 includes a network interface 310 enabling radio communication with other devices within a wireless network 312, and a data processing unit 320. The device may also include a user interface 330 that would enable interaction with an operator, and a memory 340 for storing information and software.

Figure 4:
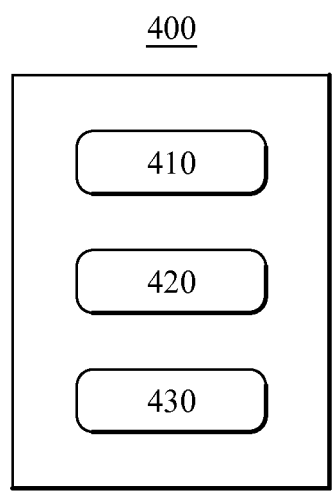
FIG. 4 is a block diagram of an apparatus able to perform a tracking method according to another embodiment.

In another embodiment illustrated in FIG. 4, an apparatus 400 includes hardware and software modules for shipment tracking. Apparatus 400 includes a receiver 410 configured to receive a network attachment request with a network-type identifier from a radio module included in a shipment. Apparatus 400 further includes a processing module configured to determine whether the network-type identifier is associated with a shipment identifier. If determined that such association is active, a location information storing module 430 generates and stores a record including information about location of the shipment when the radio module has transmitted the network attachment request.

Figure 5:
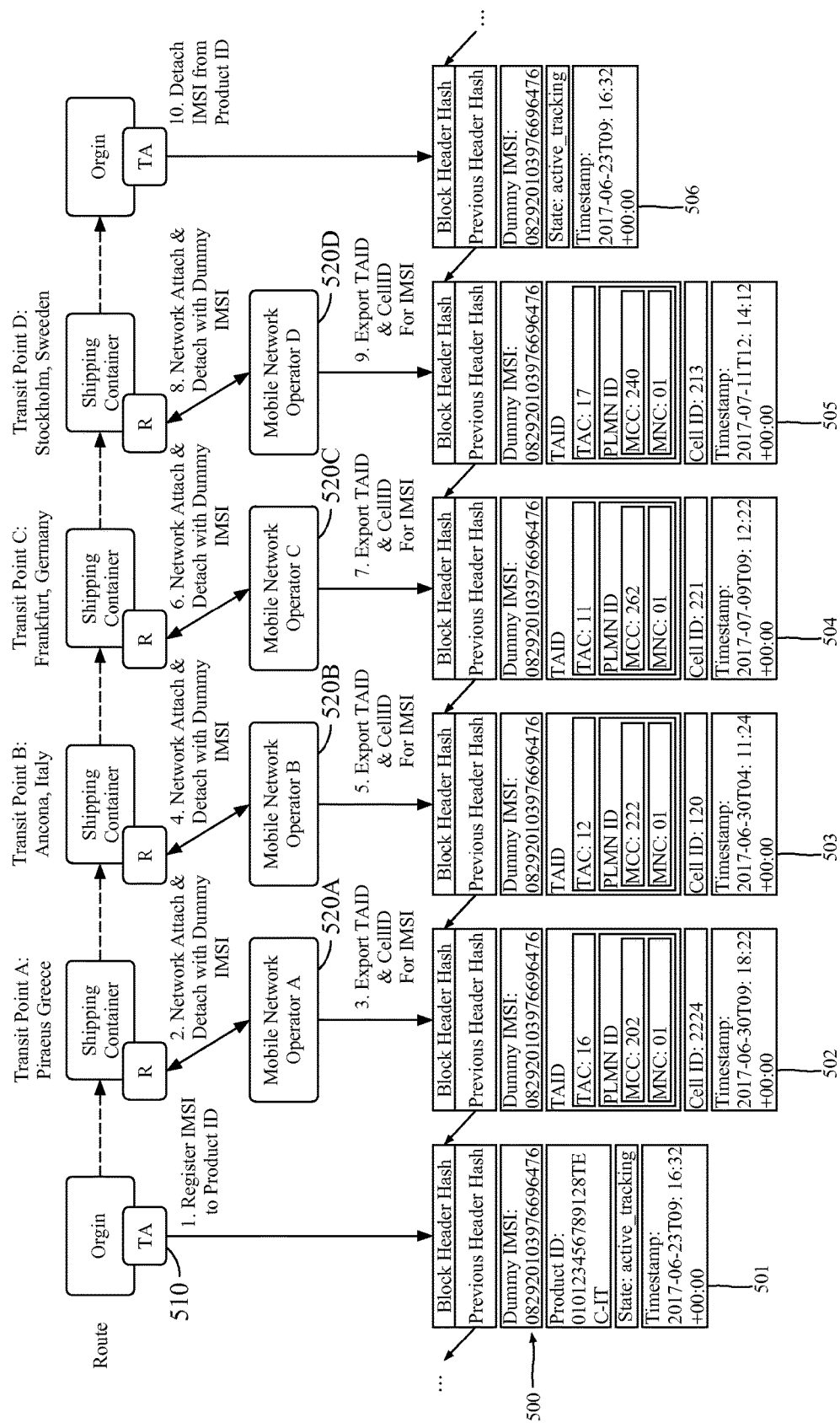
FIG. 5 illustrates a blockchain used in some embodiments to store shipment location information.
Figure 8:
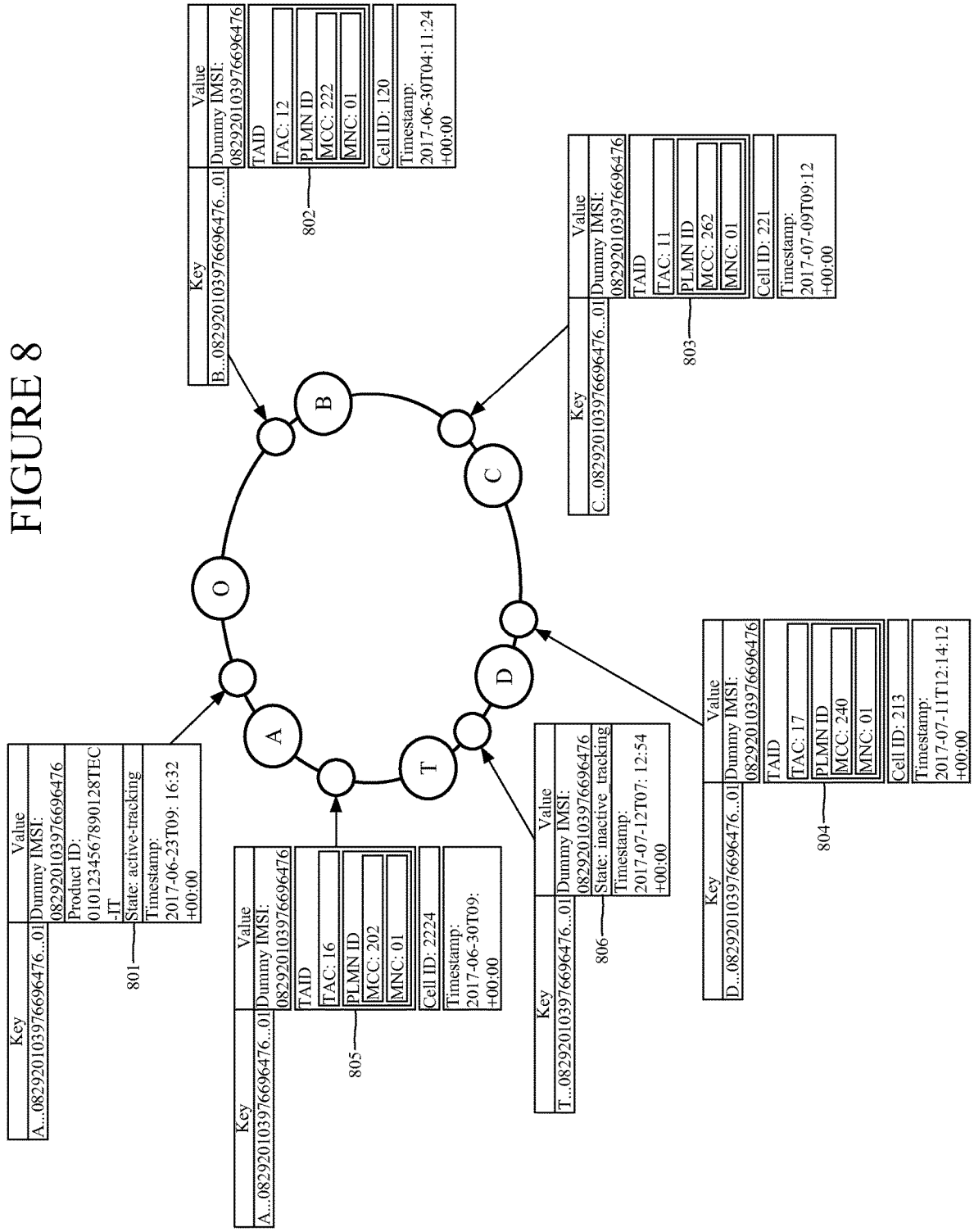
FIG. 8 illustrates a chord ring-inspired distributed hash table used in some embodiments to store shipment location information.

Embodiments of the data structures used for storing and retrieving shipment location information are illustrated in FIGS. 5 and 8. FIG. 5 illustrates a blockchain 500 used for tracking a shipment container with a radio module R along a route from origin to destination. At the origin, when the radio module is attached to the shipment container, a transit authority, TA, registers with the network the pair made of the radio module's IMSI and a shipment identifier.

The shipment identifier may be a product ID (such as, a Global Trade Item Number, GTIN), a Vehicle Identification Number (VIN), Stockkeeping Unit (SKU), European Article Number (EAN), Japanese Article Number (JAN), International Standard Block Number (ISBN), Manufacturer Part Number (MPN) uniquely related to the shipment content, or an International Mobile Equipment Identity unique to the radio module. This list of potential shipment identifiers is not exhaustive or limiting. In FIG. 5, the blockchain's initial record 501 stores the dummy IMSI, the product ID (serving as shipment identifier) and a state indicator together with a timestamp corresponding to the date and time, when the network was informed by the association of the dummy IMSI with the product ID. The term "timestamp" refers to a digital record of date and time attributes of occurrence of an event.

At different predetermined times along the route, the radio module R attempts to attach to the network using the Dummy IMSI. The base stations 520A-D receiving these attachment requests serve different cells. The blockchain is augmented by adding a record each time the radio module sends a network attachment request. Such a record (e.g., 502-505) indicates the location of the shipment container when the radio module has transmitted the network attachment request.

In a non-limiting embodiment, blockchain records 501-505 illustrated in FIG. 5 store location information using tracking area identifiers (TAID) and cell identifiers (CellIDs) corresponding to the areas where the radio module was located when sending the network attachment requests. This TAID/CellID includes a Tracking Area Code (TAC), a Public Land Mobile Network Identity (PLMNID) and the cell identifier.

The PLMNID includes a three-digit mobile country code (MCC) and a two-digit mobile network code (MNC). The MCC and MNC values in 502-505 indicate that the shipment container traveled through different countries, but attempted to connect to the same network (e.g., Vodaphone).

TAC identifies a tracking area within a mobile network, and it is established by the mobile network operator. Such tracking area may cover a set of cells, e.g., it may indicate a neighborhood or a city borough. The CellID uniquely corresponds to a cell.

In another embodiment, records indicate the shipment's locations as geographical coordinates (e.g., latitude, longitude and maybe an area around these coordinates).

Records 501-506 also include timestamps pin-pointing the moments when the network attachment requests were received.

Once the shipment reaches the destination, the radio module R is separated from the shipment, and another transit authority sends a message indicating that the dummy IMSI is no longer attached to the product ID. It is reasonable to assume that transit authority devices performing such are located at shipment and destination locations. Blockchain 500 ends with a record 506 indicating that the dummy IMSI is no longer active and a timestamp.

Figure 6:
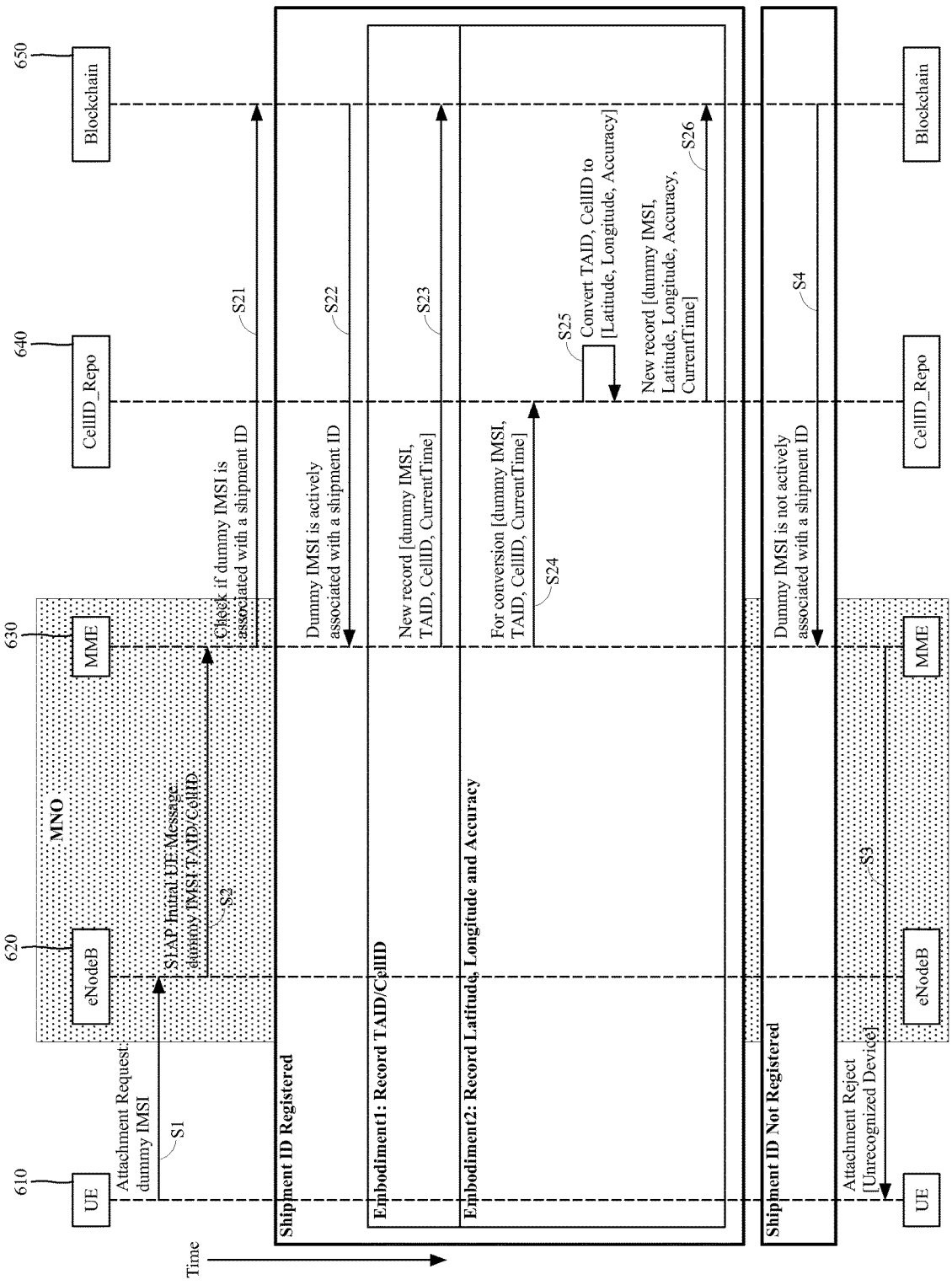
FIG. 6 illustrates a scenario for creating a shipment location record according to an embodiment.

For a tracking method using a blockchain, FIG. 6 illustrates in detail a scenario for creating a shipment location record. As in FIG. 1, a radio module 610 sends a network attachment request at S1, the base station 620 forwards the dummy IMSI included in the request with network node-related information (PLMNID, TAC and CellID) to MME 630 at S2, and MME 630 rejects the attachment request at S3. The attachment request may be already implemented according to mobile network standards (e.g., LTE), the dummy IMSI standing for the EPS mobility identity.

Further, at S21, MME sends a message including the dummy IMSI to an information repository 650 to check whether the dummy IMSI is actively associated with a shipment ID (e.g., there is a blockchain whose initial record indicates this association as being active and no final record). If the information repository 650 replies that indeed there is an active blockchain for the dummy IMSI (i.e., the dummy IMSI is currently associated with a shipment ID or the shipment identity is registered) at S22, in a first embodiment, the MME 630 sends a message including the network node-related information for locating the shipment to the information repository at S23. In a second embodiment, the MME 630 sends a message including the network node-related information to a location conversion module 640 at S24. Module 640 is configured to convert the network node-related information into geographical coordinates at S25, and then to forward these coordinates with a timestamp to the information repository 650, at S26.

For both embodiments, information repository 650 then adds a record to the blockchain based on the received location information. However, information repository 650 may reply to S21 by indicating that there is no active blockchain for the dummy IMSI at S4. Note that module 640 and repository 650 may be executed on devices outside the mobile network's core.

Figure 7:
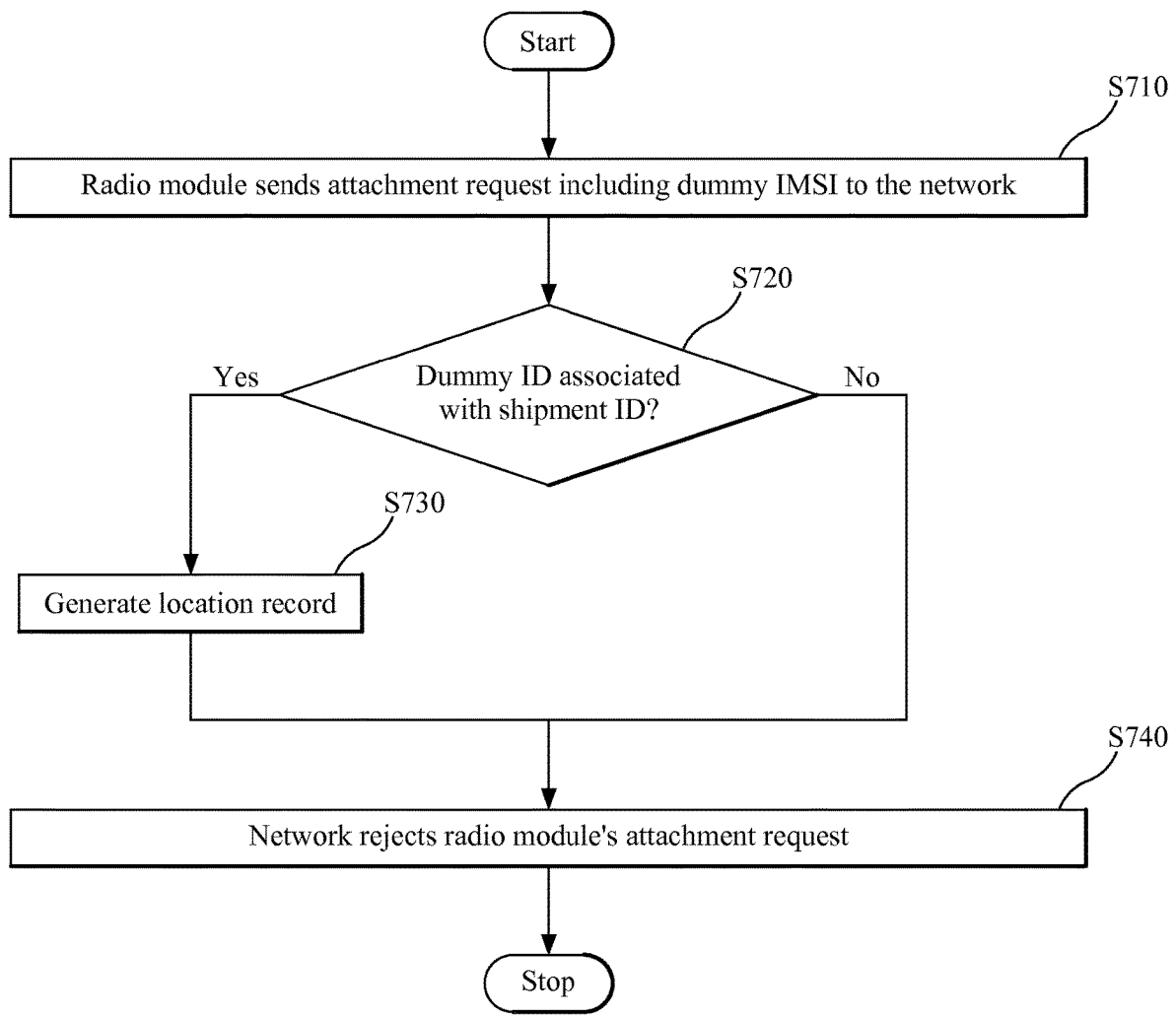
FIG. 7 is a flowchart corresponding to the scenario in FIG. 6.

In order to ease understanding of the scenario in FIG. 6, a flowchart thereof is illustrated in FIG. 7. The first action is performed by the radio module who sends an attachment request including its dummy IMSI to the network at S710. The network determines whether the dummy ID included in the request has been associated with a Shipment ID at S720 (which includes S2 and S21). If YES, such an association is active (S22), then a location record is generated and stored at S730. The location record may contain information in network node-related information (Embodiment 1) or geographical coordinates (Embodiment 2). Regardless whether the dummy ID included in the request has been associated with a Shipment ID or not, the network rejects the radio module's attachment request at S740.

FIG. 8 illustrates a chord ring-inspired distributed hash table (DHT) that may be used instead of the blockchain. The records (801-806) in this data structure include a "key" field and a "value" field. The key field stores an indicator of the type of record and common identifier for all records related to the same dummy IMSI and shipment ID pair. The type of record may be O if the record is an initial record (e.g., 801 corresponding to blockchain's initial record 501), A-D for records along the route between origin and destination (e.g., 802-805 corresponding to blockchain's records 502-505), and T if the record is a final record added at the destination (e.g., 806 corresponding to blockchain's final record 506). The value fields of records 802-805 include location information similar to the blockchain's records 502-505. Similar with the blockchain's records, the chord ring-inspired DHT's records include timestamps.

Figure 9:
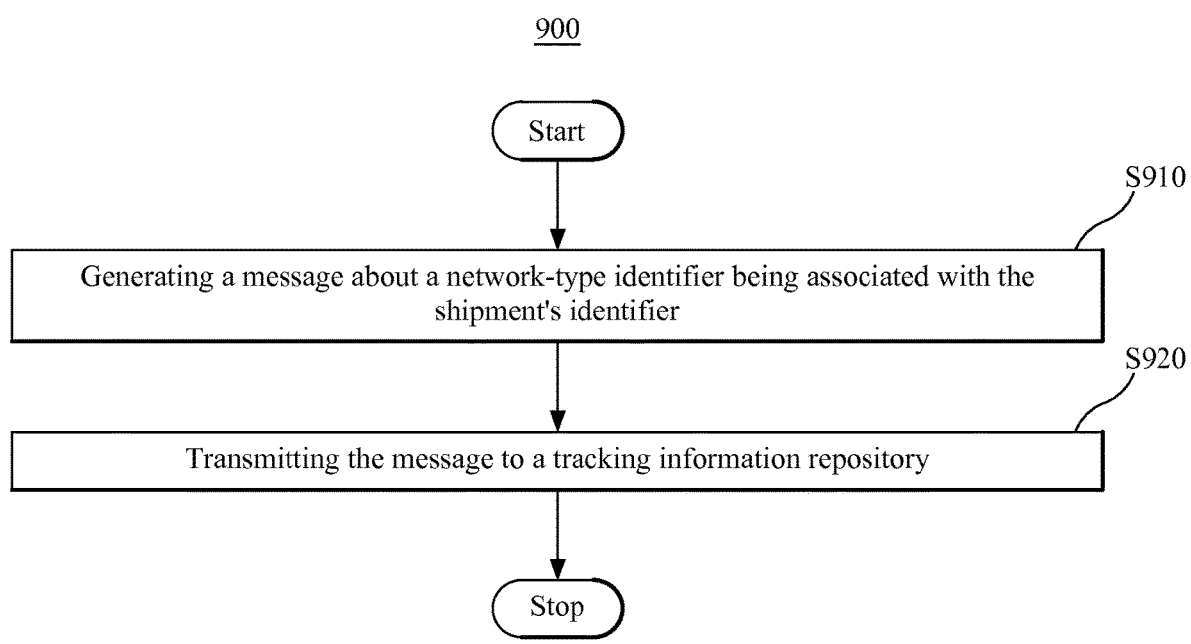
FIG. 9 is a flowchart of a method for enabling tracking using wireless infrastructure according to an embodiment.

As already mentioned, in order to perform tracking using a wireless mobile network, a transit authority device has to be present at least at the location where shipping initiates. The transit authority controlling this kind of device attaches the activated radio module to the shipment and ships them to the destination. The radio module is activated when turned ON and programmed to send attachment requests using its IMSI. FIG. 9 illustrates a method 900 performed by a transit authority device. Method 900 includes generating a message about a network-type identifier being associated with the shipment's identifier at S910, and transmitting the message to a tracking information repository at S920. The message may trigger, for example, initiation of a blockchain. The same transit authority device may send a message to cause ending the blockchain when the shipment has reached its destination, where the transit authority is located. However, some embodiments may provide a blockchain be closed when no new record occurs for a predetermined time (e.g., longer than the scheduled interval between attachments requests), or when the radio module's dummy IMSI is registered with another shipment ID.

Figure 10:
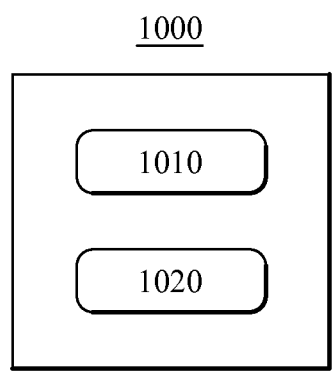
FIG. 10 is a block diagram of a device able to perform the method in FIG. 8 according to another embodiment.

The transit authority device may have a structure similar with the structure illustrated in FIG. 3 (i.e., including a network interface 310, a data processing unit 320, a user interface 330 and a memory 340). However, a transit authority device 1000 able to perform methods such as method 900 may have a modular structure as illustrated in FIG. 10. Device 1000 includes a message generator module 1010 for generating tracking information repository, and a transceiver module 1020 for transmitting the message to the network.

The transit authority device or another device at a retail point or controlled by an end-consumer who is the intended recipient of goods may be used to request tracking information related to a shipment ID. Such a tracking information requestor may have read-only access to the blockchain. An application program interface is designed to present the shipment's location information to the tracking information requestor.

Figure 11:
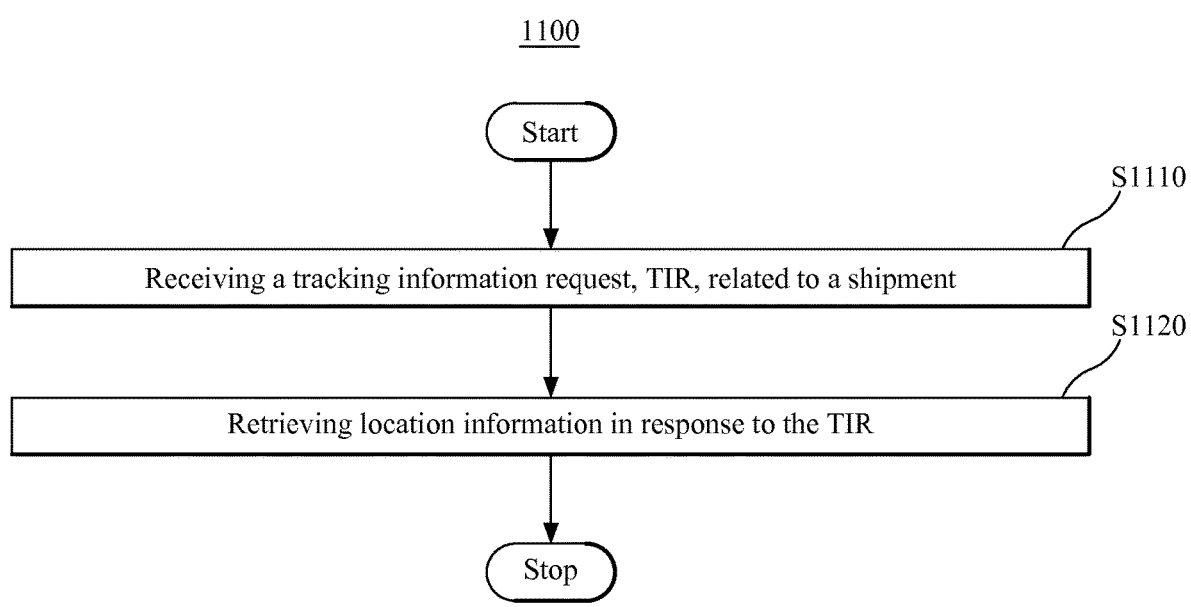
FIG. 11 is a flowchart of a method for providing tracking information according to an embodiment.

FIG. 11 is a flowchart of a method 1100 performed by a network operator device tracking a shipment including a radio module according to another embodiment. Method 1100 includes receiving a tracking information request, TIR, related to the shipment at S1110, and retrieving a shipment's location information in response to the TIR. The TIR should include at least one of the shipment's identifier and the radio module's dummy IMSI. A shipment's location information may include position-time pairs along a route between a shipping location and a shipment destination. These position-time pairs may be retrieved from a blockchain or a hash table made of records generated any time a network attachment request with the network-type identifier was received by a network device. Such a blockchain may be initialized when the shipment identifier is associated with the radio module's dummy IMSI at the shipping location.

The location information may be presented as position-time pairs along a route between the shipping location and the destination of the shipment. Such the position-time pairs may be retrieved from a blockchain made of records generated any time a network attachment request with the network-type identifier was received by a network device, the blockchain having been initialized when the shipment identifier was associated with the network-type identifier at the shipping location. If a location in the position-time pairs is identified based on network node-related information provided by the network node receiving the network attachment request, the network node-related information may be converted into geographical coordinates before being provided in response to a TIR.

Figure 12:
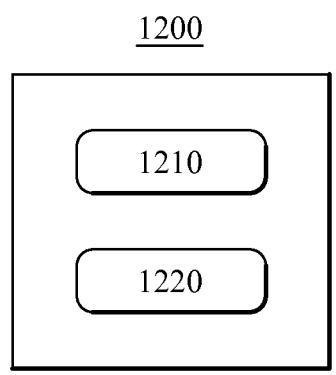
FIG. 12 is a block diagram of a device able to perform the method in FIG. 11 according to another embodiment.

A network device (able to perform method 1100 may have a structure similar with the structure illustrated in FIG. 3 (i.e., including a network interface 310, a data processing unit 320, a user interface 330 and a memory 340). However, such a device able to perform methods similar to method 1100 may have a modular structure as illustrated in FIG. 12. Device 1200 includes a receiver module 1210 configured to receive a TIR related to a shipment, and a processing module 1220 configured to retrieve a shipment's location information.

Figure 13:
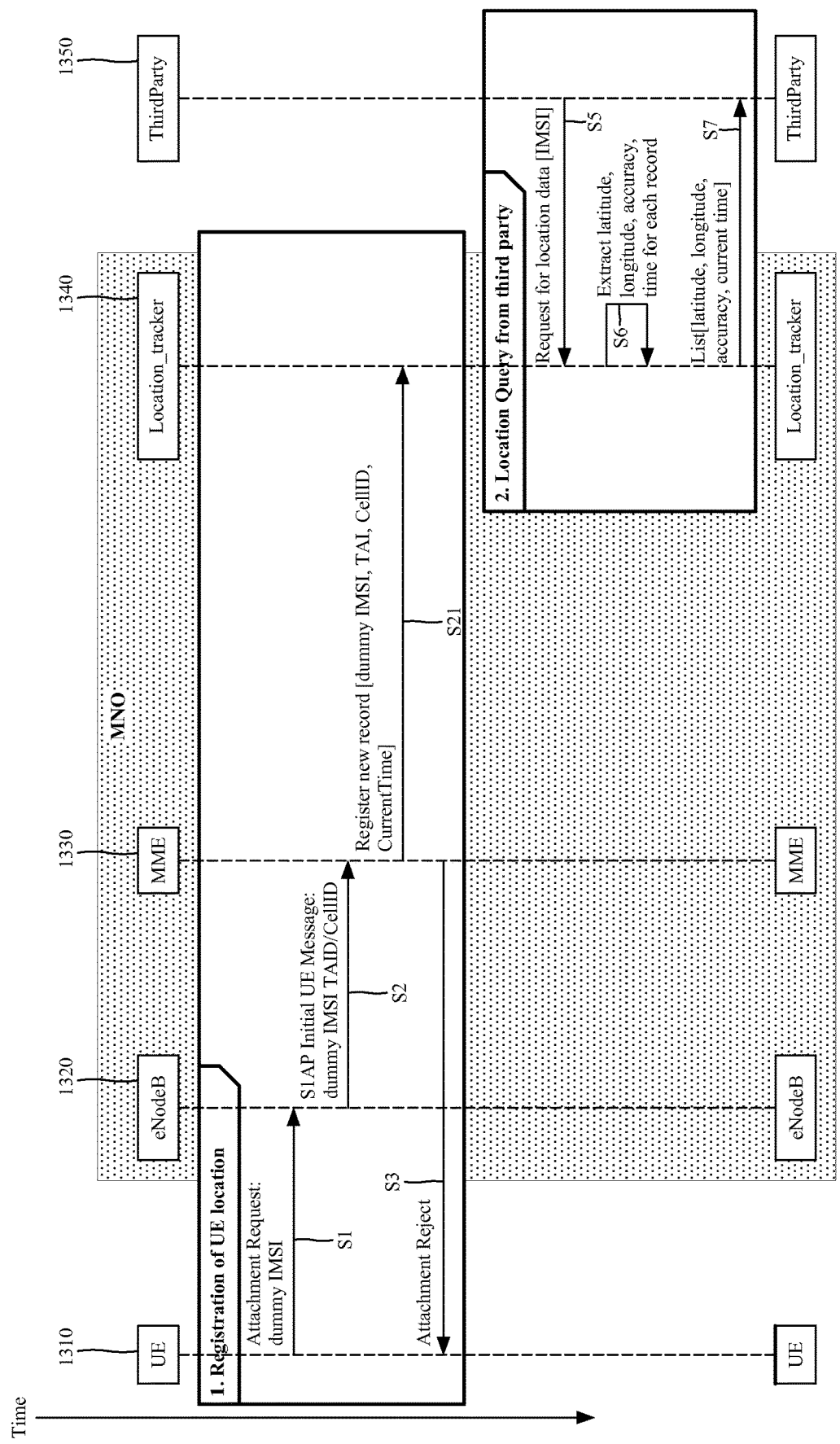
FIG. 13 illustrates a scenario for providing tracking information according to an embodiment.

If a location in the position-time pairs is identified based on network node-related information of the network node receiving the network attachment request, method 1100 may further include converting network node-related information into geographical coordinates. FIG. 6 illustrates such a conversion being performed outside the mobile network's core. In an alternative embodiment, FIG. 13 illustrates a client-server scenario according to the conversion performed by a location tracker node 1340 upon receiving a TIR.

As in FIG. 6, a radio module 1310 sends a network attachment request at S1, the base station 1320 forwards the dummy IMSI included in the request with network node-related information (PLMNID, TAC and CellID) to MME 1330 at S2, and MME 1330 rejects the attachment request at S3. Although not shown in FIG. 12, the dummy IMSI may not have been associated with a shipment ID.

When a location query occurs, the location tracker receiving a request for shipment's location data at S5, the location tracker converts the stored network node-related information (PLMNID, TAC and CellID) in the shipment's record into geographical coordinates at S6, and replies to the request with a list of coordinates and times at S7.

Other embodiments of the methods described in this section are computer programs with instructions that make a data processing unit carry out these methods, respectively. The executable codes of the computer programs may be stored on computer-readable recording media (e.g., memory 340).

Some of the advantages of the embodiments described in this section are that tracking using mobile networks provides a cheap solution (as cheap radio modules may be employed) that can be implemented with minimal effort and has basically ubiquitous coverage. These methods may also prevent loss of shipments. This tracking approach is especially suited for urban or semi-urban environments where Radio Base Stations are densely deployed.

The embodiments disclosed in this section provide methods and network devices for tracking shipments using existing mobile networks. This description is not intended to limit the invention. On the contrary, the exemplary embodiments are intended to cover alternatives, modifications and equivalents, which are included in the scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments with particular combinations thereof, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A network operator device for tracking a shipment including a radio module, the network operator device comprising a network interface and a processor configured to:
   receive a network attachment request with a network-type identifier, from a radio module that is included in a shipment;
   determine whether the network-type identifier is associated with a shipment identifier;
   generate a record indicating a location of the shipment when the radio module has transmitted the network attachment request, if determined that the network-type identifier is associated with the shipment identifier, even if the network attachment request is rejected; and
   reject the network attachment request even if the network-type identifier is associated with the shipment identifier.

2. The network operator device of claim 1, wherein the record is included in a blockchain created when the network-type identifier was associated with the shipment identifier.

3. The network operator device of claim 1, wherein the record is stored in a distributed hash table initiated when the network-type identifier was associated with the shipment identifier.

4. The network operator device of claim 1, wherein a timestamp for the receiving of the network attachment request is included in the record.

5. The network operator device of claim 1, wherein the location is identified based on network node-related information.

6. The network operator device of claim 5, wherein the network interface and processor are further configured to:
   convert the network node-related information into geographical coordinates.

7. A method performed by a network node for tracking shipments that include radio modules, the method comprising:
   receiving a network attachment request with a network-type identifier, from a radio module that is included in a shipment;
   determining whether the network-type identifier is associated with a shipment identifier; and
   generating a record indicating a location of the shipment when the radio module has transmitted the network attachment request, if determined that the network-type identifier is associated with the shipment identifier, even if the network attachment request is rejected; and
   rejecting the network attachment request even if the network-type identifier is associated with the shipment identifier.

8. A transit authority device for tracking shipments that include User Equipments 'UEs', the transit authority device comprising a network interface and a processor configured to:
   generate a message about a network-type identifier being associated with a shipment identifier of a shipment; and
   transmit the message to a tracking information repository, wherein a UE included in the shipment is configured to submit one or more requests to attach to a radio network using the network-type identifier, generate a record indicating a location of the shipment when the UE has transmitted the one or more requests, even if the one or more requests is rejected, and receive a rejection of the one or more requests, wherein the one or more requests is rejected even if the network-type identifier is associated with the shipment identifier.

9. The transit authority device of claim 8, wherein the network-type identifier is an International Mobile Subscriber Identity, IMSI, and/or the shipment identifier includes a Global Trade Item Number, GTIN, a Vehicle Identification Number or an International Mobile Equipment Identity of the UE.

10. The transit authority device of claim 8, wherein the network interface and processor are further configured to:
generate another message to signal that the network-type identifier is no longer associated with the shipment identifier after the shipment has reached its destination.

11. A network operator device for tracking shipments that include radio modules, the network operator device comprising a network interface and a processing unit configured to:
receive a tracking information request, TIR, related to the shipment; and
retrieve location information in response to the TIR,
wherein the TIR includes at least one of a shipment identifier of the shipment and a network-type identifier associated with the shipment identifier, the network-type identifier being used by the radio module for sending one or more network attachment requests generating a record indicating a location of the shipment when the radio module has sent the one or more network attachment requests, even if the one or more network attachment requests is rejected, and rejecting the one or more network attachment requests even if the network-type identifier is associated with the shipment identifier.

12. The network operator device of claim 11, wherein the location information includes position-time pairs along a route between a shipping location and a destination of the shipment.

13. The network operator device of claim 12, wherein the position-time pairs are retrieved from a blockchain made of records generated any time a network attachment request with the network-type identifier was received by a network device, wherein the blockchain was initialized when the shipment identifier was associated with the network-type identifier at the shipping location.

14. The network operator device of claim 13, wherein the blockchain is ends with a record indicating that the network-type identifier is no longer associated with the shipment identifier.

15. The network operator device of claim 12, wherein the network interface and processor are further configured to:
if a location in the position-time pairs is identified based on network node-related information of a network node receiving the network attachment request, convert network node-related information into geographical coordinates.

* * * * *